United States Patent
Cao et al.

(10) Patent No.: US 11,754,467 B2
(45) Date of Patent: Sep. 12, 2023

(54) THREE-DIMENSIONAL FORCE LOADING DEVICE FOR MOTOR SPINDLE

(71) Applicant: Harbin Institute of Technology, Harbin (CN)

(72) Inventors: Jiwei Cao, Harbin (CN); Chengming Zhang, Harbin (CN); Liyi Li, Harbin (CN); Jiaxi Liu, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 17/831,773

(22) Filed: Jun. 3, 2022

(65) Prior Publication Data
US 2022/0390325 A1    Dec. 8, 2022

(30) Foreign Application Priority Data
Jun. 8, 2021  (CN) .......................... 202110636288.1

(51) Int. Cl.
*G01M 13/027* (2019.01)

(52) U.S. Cl.
CPC .................. *G01M 13/027* (2013.01)

(58) Field of Classification Search
CPC . G01M 13/027; G01M 13/025; G01L 5/0042; G01L 5/0076; G01L 5/22
See application file for complete search history.

(56) References Cited

U.S. PATENT DOCUMENTS

| 6,496,789 B2* | 12/2002 | Seth | ......................... B23Q 5/04 |
| | | | 702/182 |
| 6,938,500 B2* | 9/2005 | Beaman | .............. G01M 13/027 |
| | | | 73/331 |
| 7,080,565 B2* | 7/2006 | Delair | ................. G01M 13/027 |
| | | | 73/862.325 |
| 2002/0077776 A1* | 6/2002 | Seth | ....................... B23Q 17/12 |
| | | | 702/182 |
| 2004/0255698 A1* | 12/2004 | Beaman | .............. G01M 13/027 |
| | | | 73/862.49 |

FOREIGN PATENT DOCUMENTS

| CN | 102721535 | 10/2012 |
| CN | 104006957 | 8/2014 |
| CN | 105414997 | 3/2016 |
| CN | 105890841 | 8/2016 |

* cited by examiner

*Primary Examiner* — Freddie Kirkland, III
(74) *Attorney, Agent, or Firm* — Marcus C. Dawes

(57) ABSTRACT

A three-dimensional force loading device for a motor spindle is provided, and relates to the field of motor spindle testing. The device including a bottom plate; a torque loading assembly configured for testing torque performance of the motor spindle, and the torque loading assembly is in transmission connection with the motor spindle; a sleeve shell rotatably sleeved on the motor spindle, the sleeve shell is fixed along an axis direction of the motor spindle; a radial force loading assembly configured for testing radial force performance of the motor spindle, and the radial force loading assembly is fixedly connected with the sleeve shell; an axial force loading assembly configured for testing axial force performance of the motor spindle; and a intermediate force transmission mechanism connected with the sleeve shell and the axial force loading assembly.

9 Claims, 4 Drawing Sheets

THREE-DIMENSIONAL FORCE LOADING DEVICE FOR MOTOR SPINDLE

CROSS REFERENCE TO RELATED APPLICATION

This patent application claims the benefit and priority of Chinese Patent Application No. 202110636288.1, entitled "THREE-DIMENSIONAL FORCE LOADING DEVICE FOR MOTOR SPINDLE" filed with the Chinese Patent Office on Jun. 8, 2021, the disclosure of which is incorporated by reference herein in its entirety as a part of the present application.

TECHNICAL FIELD

The present disclosure relates to the field of motor spindle testing, and particularly relates to a three-dimensional force loading device for a motor spindle.

BACKGROUND ART

At the present stage, high-precision machining of numerical control machine tools becomes a core factor that determines the national comprehensive capacity. For a motor spindle as a core part of a numerical control machine tool, performance of the motor spindle directly determines precision, performance and machining quality of the whole system. When the motor spindle works actually, the spindle drives a knife handle to cut a workpiece. At this time, forces applied to the motor spindle include torque caused by rotary cutting of the knife handle, a radial force caused by the feeding of the knife handle, and an axial force caused by axial extension of the spindle due to being heated or other factors. However, existing motor spindle test systems include relevant test systems of motors, and most of the systems can only carry out relevant tests on torque, whereas cannot enable relevant tests on performance of both the radial force and the axial force.

Therefore, how to overcome the defects becomes an urgent problem to be solved by those skilled in the art.

SUMMARY

In order to solve the technical problem, the present disclosure provides a three-dimensional force loading device for a motor spindle, so as to enable relevant tests on the performance of all of torque, a radial force and an axial force of the motor spindle.

In order to achieve the purpose, the present disclosure provides the following scheme:

The present disclosure provides a three-dimensional force loading device for a motor spindle. The three-dimensional force loading device for a motor spindle includes a bottom plate, a torque loading assembly, a sleeve shell, a radial force loading assembly, an axial force loading assembly and a intermediate force transmission mechanism. The torque loading assembly is configured for testing torque performance of the motor spindle, the torque loading assembly and the motor spindle are both arranged on the bottom plate, and the torque loading assembly is in transmission connection with the motor spindle; the sleeve shell is rotatably sleeved on the motor spindle, and the sleeve shell is fixed along an axis direction of the motor spindle; the radial force loading assembly is configured for testing radial force performance of the motor spindle, the radial force loading assembly is arranged on the bottom plate and configured for providing a radial loading force perpendicular to the axis direction of the motor spindle, and the radial force loading assembly is fixedly connected with the sleeve shell; the axial force loading assembly is configured for testing axial force performance of the motor spindle, and the axial force loading assembly is arranged on the bottom plate and configured for providing an axial loading force along the axis direction of the motor spindle; and the intermediate force transmission mechanism is connected with the sleeve shell and the axial force loading assembly to transmit the axial loading force supplied by the axial force loading assembly to the sleeve shell.

In some embodiments, the motor spindle and the torque loading assembly may be respectively provided with a first flange and a second flange which are connected via a flexible connecting belt, to enable the transmission connection between the torque loading assembly and the motor spindle.

In some embodiments, the torque loading assembly may be a dynamometer.

In some embodiments, the three-dimensional force loading device for a motor spindle further includes a bearing, the sleeve shell may be rotatably sleeved on a connecting rod of the motor spindle via the bearing, and the bearing may enable the sleeve shell to be fixed along the axis direction of the motor spindle.

In some embodiments, the bearing may be a deep groove ball bearing or an angular contact bearing.

In some embodiments, the three-dimensional force loading device for a motor spindle further includes an alternating power supply, the radial force loading assembly may be a radial electromagnetic force loading assembly, the axial force loading assembly may be an axial electromagnetic force loading assembly, the radial electromagnetic force loading assembly may be electrically connected with the alternating power supply to provide a radial electromagnetic force perpendicular to the axis direction of the motor spindle, and the axial force loading assembly may be electrically connected with the alternating power supply to provide an axial electromagnetic force along the axis direction of the motor spindle.

In some embodiments, the radial force loading assembly includes a first base, a first upper shell, a first force detector, a first loading rod, at least one first coil and at least one first magnet, the first base may be fixedly connected with the bottom plate, the first upper shell may be arranged above the first base, the first upper shell may be slidably connected with the first base, the at least one first coil and the at least one first magnet may be arranged between the first upper shell and the first base, the at least one first coil may be electrically connected with the alternating power supply, the first loading rod may be connected with the first upper shell via the first force detector, and the first force loading rod may be fixedly connected with the sleeve shell; the axial force loading assembly includes a second base, a second upper shell, a second force detector, a second loading rod, at least one second coil and at least one second magnet, the second base may be fixedly connected with the bottom plate, the second upper shell may be arranged above the second base, the second upper shell may be slidably connected with the second base, the at least one second coil and the at least one second magnet may be arranged between the second upper shell and the second base, the at least one second coil may be electrically connected with the alternating power supply, the second loading rod may be connected with the second upper shell via the second force detector, and the second force loading rod may be fixedly connected with the intermediate force transmission mechanism.

In some embodiments, the three-dimensional force loading device for a motor spindle further includes a first air supply unit and a second air supply unit, the first air supply unit may be configured for supplying air between the first base and the first upper shell to enable the first upper shell to suspend above the first base, and the second air supply unit may be configured for supplying air between the second base and the second upper shell to enable the second upper shell to suspend above the second base.

In some embodiments, the intermediate force transmission mechanism includes a rotating rod and a supporting rod, the supporting rod may be arranged on the bottom plate, the rotating rod may be rotatably connected with the supporting rod, one end of the rotating rod may be fixedly connected with the sleeve shell, and an other end of the rotating rod may be fixedly connected with the axial force loading assembly.

Compared with the prior art, the embodiments have the following technical effects.

The present disclosure provides a three-dimensional force loading device for a motor spindle. The three-dimensional force loading device for a motor spindle includes a bottom plate, a torque loading assembly, a sleeve shell, a radial force loading assembly, an axial force loading assembly and a intermediate force transmission mechanism. The torque loading assembly is configured for testing the torque performance of the motor spindle. The torque loading assembly and the motor spindle are both arranged on the bottom plate, and the torque loading assembly is in transmission connection with the motor spindle. The sleeve shell is rotatably sleeved on the motor spindle, and the sleeve shell is fixed along the axis direction of the motor spindle. The radial force loading assembly is configured for testing the radial force performance of the motor spindle, arranged on the bottom plate, and configured for providing a radial loading force perpendicular to the axis direction of the motor spindle. The radial force loading assembly is fixedly connected with the sleeve shell. The axial force loading assembly is configured for testing the axial force performance of the motor spindle, arranged on the bottom plate, and configured for providing an axial loading force along the axis direction of the motor spindle. The intermediate force transmission mechanism is connected with both the sleeve shell and the axial force loading assembly to transmit the axial loading force provided by the axial force loading assembly to the sleeve shell. In the specific use process, the torque loading assembly can achieve torque performance testing of the motor spindle, the radial force loading assembly can achieve radial force performance testing of the motor spindle, and the axial force loading assembly can achieve axial force performance testing of the motor spindle. Thus, the three-dimensional force loading device for a motor spindle provided by the embodiments can achieve relevant tests on the performance of all of the torque, the radial force and the axial force of the motor spindle.

BRIEF DESCRIPTION OF THE DRAWINGS

To more clearly illustrate the embodiments of the present disclosure or the technical scheme in the prior art, the following briefly introduces the attached figures to be used in the embodiments. Apparently, the attached figures in the following description show merely some embodiments of the present disclosure, and those skilled in the art may still derive other drawings from these attached figures without creative efforts.

LIST OF REFERENCE CHARACTERS

Figure 1:
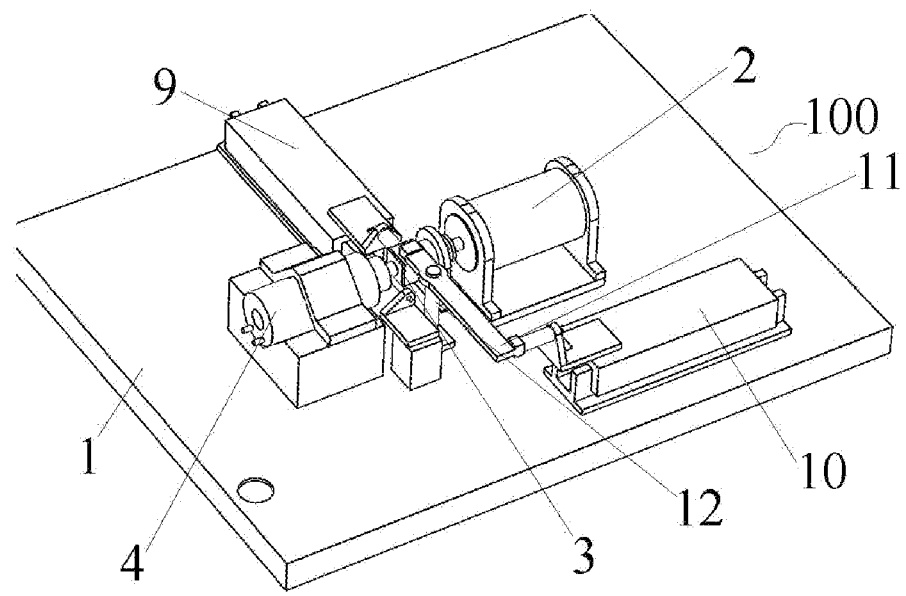
FIG. 1 is a three-dimensional force loading device for a motor spindle according to an embodiment of the present disclosure.

100 three-dimensional force loading device for a motor spindle; 1 bottom plate; 2 dynamometer; 201 output shaft; 3 sleeve shell; 4 motor spindle; 401 connecting rod; 5 first flange; 6 second flange; 7 flexible connecting belt; 8 bearing; 9 radial force loading assembly; 901 first base; 902 first upper shell; 903 first force detector; 904 first loading rod; 905 first coil; 906 first magnet; 10 axial force loading assembly; 11 rotating rod; 12 supporting rod; and 13 alternating power supply.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a three-dimensional force loading device for a motor spindle which can achieve relevant tests on performance of all of torque, a radial force and an axial force of the motor spindle.

To make the foregoing objective, features and advantages of the present disclosure clearer and more comprehensible, the present disclosure is further described in detail below with reference to the attached figures and specific embodiments.

Referring to FIGS. 1 to 7, the present disclosure provides a three-dimensional force loading device for a motor spindle 100. The three-dimensional force loading device for a motor spindle 100 includes a bottom plate 1, a torque loading assembly, a sleeve shell 3, a radial force loading assembly 9, an axial force loading assembly 10 and a intermediate force transmission mechanism. The torque loading assembly is configured for testing torque performance of a motor spindle 4. The torque loading assembly and the motor spindle 4 are both arranged on the bottom plate 1, and the torque loading assembly is in transmission connection with the motor spindle 4. The sleeve shell 3 is rotatably sleeved on the motor spindle 4, and the sleeve shell 3 is fixed along an axis direction of the motor spindle 4. The radial force loading assembly 9 is configured for testing radial force performance of the motor spindle 4, arranged on the bottom plate 1, and configured for providing a radial loading force perpendicular to the axis direction of the motor spindle 4. The radial force loading assembly 9 is fixedly connected with the sleeve shell 3. The axial force loading assembly 10 is configured for testing axial force performance of the motor spindle 4, arranged on the bottom plate 1 and configured for providing an axial loading force along the axis direction of the motor spindle 4. And, the intermediate force transmission mechanism is connected with the sleeve shell 3 and the axial force loading assembly 10 to transmit the axial loading force provided by the axial force loading assembly 10 to the sleeve shell 3. According to the three-dimensional force loading device for a motor spindle 100 provided by the embodiments of the present disclosure, the torque loading assembly, the radial force loading assembly 9 and the axial force loading assembly 10 can respectively achieve relevant tests of the torque performance, the radial force performance and the axial force performance of the motor spindle 4. In this way, the defect that an existing three-dimensional force loading device for a motor spindle 100 can only achieve the torque performance test is effectively overcome.

Figure 2:
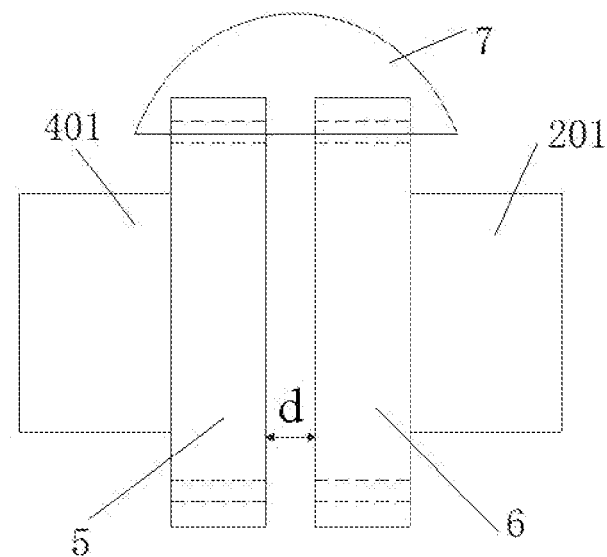
FIG. 2 is a schematic diagram of a setting mode of a flexible connecting belt.

In the embodiment, as shown in FIG. 2, the motor spindle 4 and the torque loading assembly are respectively provided with a first flange 5 and a second flange 6 which are connected via a flexible connecting belt 7, so that transmission connection between the torque loading assembly and the motor spindle 4 is achieved. Thus, a situation where the torque loading assembly affects the axial performance test and the radial performance test of the motor spindle 4 is effectively avoided. The flexible connecting belt 7 is specifically a light glass tape or carbon fiber tape. And, a first through hole and a second through hole through which the flexible connecting belt 7 passes are formed in the first flange 5 and the second flange 6 respectively. The flexible connecting belt passes through the first through hole and the second through hole to enable the connection of the first flange 5 and the second flange 6.

In the embodiment, specifically, the torque loading assembly is a dynamometer 2.

Figure 3:
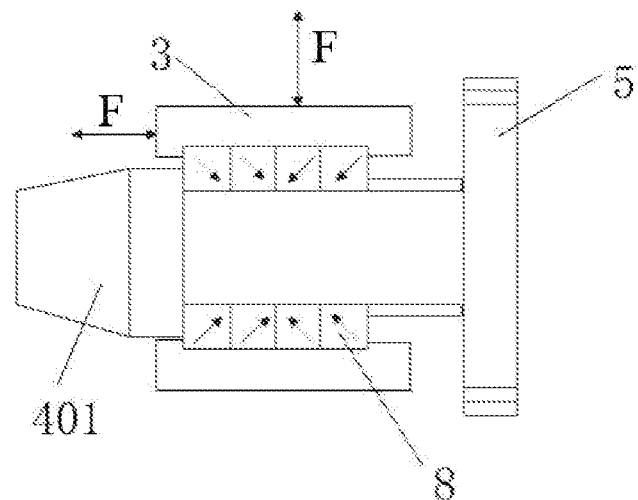
FIG. 3 is a schematic diagram of a setting mode of a sleeve shell.

In the embodiment, specifically, as shown in FIG. 3, the three-dimensional force loading device for a motor spindle 100 further includes a bearing 8. The sleeve shell 3 is rotatably sleeved on a spindle connecting rod 401 of the motor spindle 4 via the bearing 8. The bearing 8 enables the sleeve shell 3 to be fixed along the axis direction of the motor spindle 4.

In the embodiment, specifically, as shown in FIG. 2, the sleeve shell 3 is arranged on the spindle connecting rod 401 of the motor spindle 4 via the bearing 8. The first flange 5 and the second flange 6 are arranged on the spindle connecting rod 401 of the motor spindle 4 and an output shaft 201 of the dynamometer 2 respectively.

In the embodiment, specifically, the bearing 8 is a deep groove ball bearing or an angular contact bearing.

Figure 4:
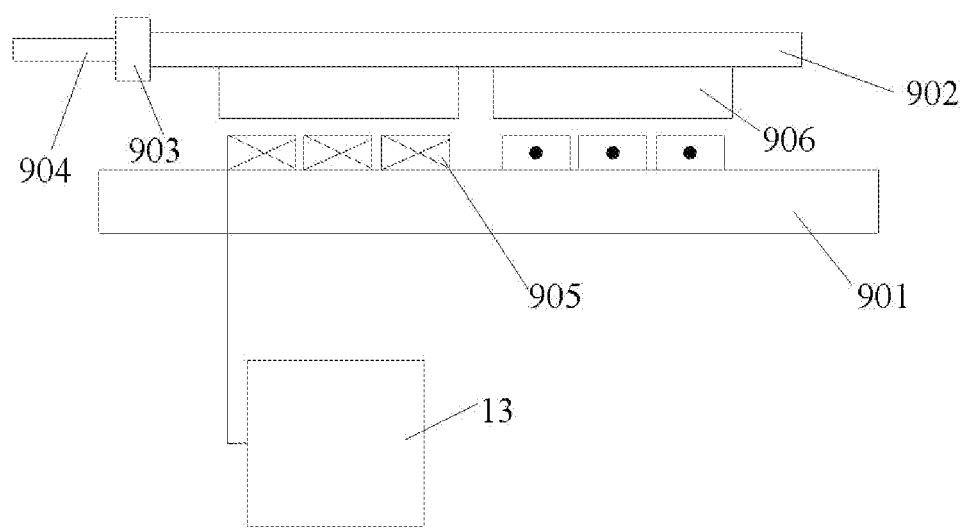
FIG. 4 is a schematic structural diagram of a radial electromagnetic force loading assembly.
Figure 5:
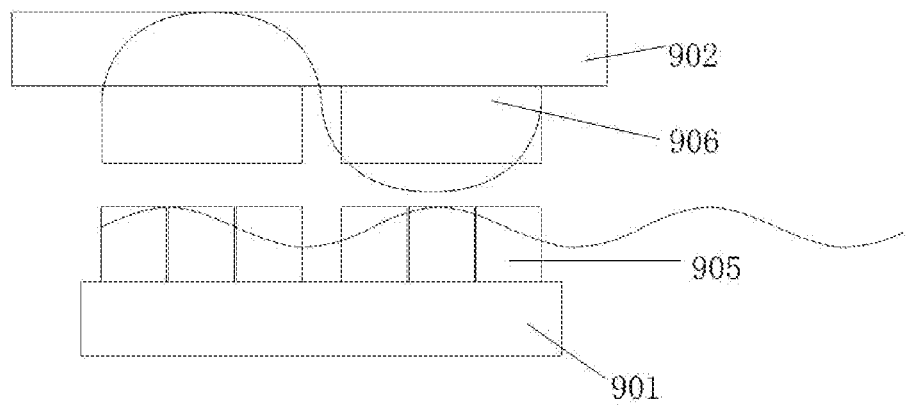
FIG. 5 is a principle diagram of generating a radial electromagnetic force.
Figure 6:
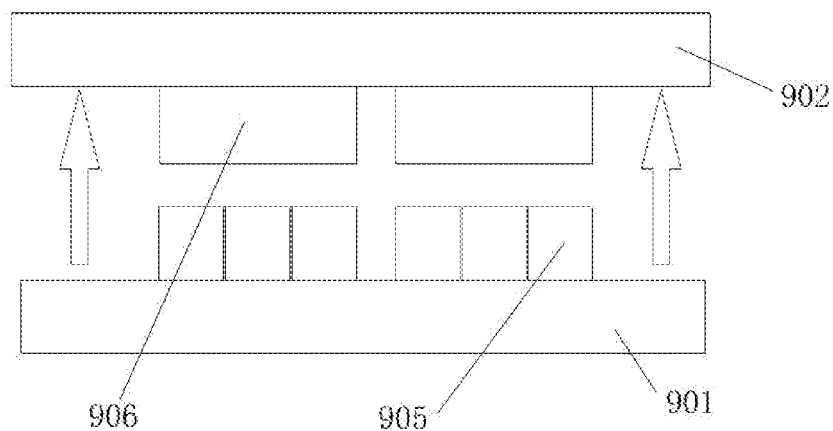
FIG. 6 is a suspension principle diagram of a first upper shell.

In the embodiment, as shown in FIGS. 4 to 5, the three-dimensional force loading device for a motor spindle 100 further includes an alternating power supply 13. The radial force loading assembly 9 is a radial electromagnetic force loading assembly. The axial force loading assembly 10 is an axial electromagnetic force loading assembly. The radial electromagnetic force loading assembly is electrically connected with the alternating power supply 13 so as to provide a radial electromagnetic force perpendicular to the axis direction of the motor spindle 4. And, the axial force loading assembly 10 is electrically connected with the alternating power supply 13 so as to provide an axial electromagnetic force along the axis direction of the motor spindle 4. The electromagnetic forces are changed in terms of the amplitude and the direction according to requirements; or are constant force. Further, the radial force loading assembly 9 includes a first base 901, a first upper shell 902, a first force detector 903, a first loading rod 904, first coil(s) 905 and first magnet(s) 906. The first base 901 is fixedly connected with the bottom plate 1. The first upper shell 902 is arranged above the first base 901. The first upper shell 902 is slidably connected with the first base 901. The first coil(s) 905 and the first magnet(s) 906 are arranged between the first upper shell 902 and the first base 901. The first coil(s) 905 is electrically connected with the alternating power supply 13. The first loading rod 904 is connected with the first upper shell 902 via the first force detector 903. The first force loading rod is fixedly connected with the sleeve shell 3. The axial force loading assembly 10 includes a second base, a second upper shell, a second force detector, a second loading rod, second coil(s) and second magnet(s). The second base is fixedly connected with the bottom plate 1. The second upper shell is arranged above the second base. The second upper shell is slidably connected with the second base. The second coil(s) and the second magnet(s) are arranged between the second upper shell and the second base. The second coil(s) is electrically connected with the alternating power supply 13. The second loading rod is connected with the second upper shell via the second force detector. The second force loading rod is fixedly connected with the intermediate force transmission mechanism.

In the specific use process, the current with different frequencies and waveforms is given via the alternating power supply, so as to enable the first upper shell 902 and the second upper shell to output a force with a certain frequency and a certain waveform. The three-dimensional force loading device for a motor spindle 100 provided by the present disclosure can select values and frequencies of the axial force and the radial force that are applied, according to requirements of actual working conditions. The axial force and the radial force can be controlled in a coupled mode or can be controlled separately, while torque loading is performed, which is the same as the actual operating condition of the motor spindle 4. Further, the test difficulty of a spindle motor is reduced, and the testing capability of the motor of the motor spindle 4 is improved.

It should be noted that number of all of the first coil(s) 905, the first magnet(s) 906, the second coil(s) and the second magnet(s) may be one or more respectively, and the specific number is depend on the magnitude of the required electromagnetic force. However, regardless of the number of all of the first coil(s) 905, the first magnet(s) 906, the second coil(s) and the second magnet(s) is one or more respectively, the first coil(s) 905 and the first magnet(s) 906 are placed at opposing positions, and the second coil(s) and the second magnet(s) are placed at opposing positions. When multiple first coils 905, multiple first magnets 906, multiple second coils and multiple second magnets are arranged, the multiple first coils 905 are arranged along a length direction of the first base 901, the multiple first magnets 906 are arranged along a length direction of the first upper shell 902, the multiple second coils are arranged along a length direction of the second base, and the second magnets are arranged along a length direction of the second upper shell.

In the embodiment, specifically, the first force detector 903 and the second force detector are both force sensors.

In the embodiment, the three-dimensional force loading device for a motor spindle 100 further includes a first air supply unit and a second air supply unit. The first air supply unit is configured for supplying air between the first base 901 and the first upper shell 902 to enable the first upper shell 902 to suspend above the first base 901. The second air supply unit is configured for supplying air between the second base and the second upper shell to enable the second upper shell to suspend above the second base. In this way, friction between the first base 901 and the first upper shell 902, and friction between the second base and the second upper shell can be effectively reduced. The first air supply unit and the second air supply unit can specifically select and use air pumps.

Figure 7:
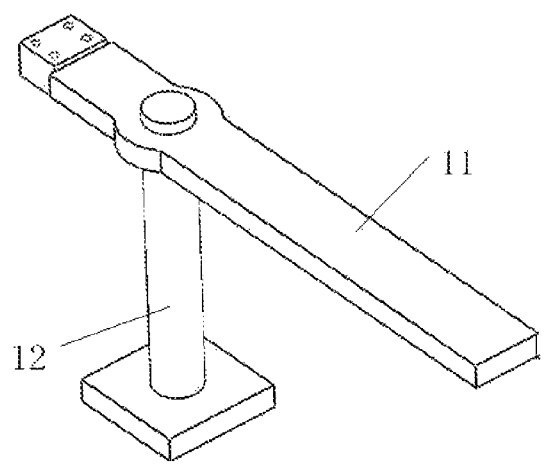
FIG. 7 is a schematic structural diagram of a intermediate force transmission mechanism.

In the embodiment, as shown in FIG. 7, the intermediate force transmission mechanism includes a rotating rod 11 and a supporting rod 12. The supporting rod 12 is arranged on the bottom plate 1. The rotating rod 11 is rotatably connected with the supporting rod 12. One end of the rotating rod 11 is fixedly connected with the sleeve shell 3, and an other end of the rotating rod 11 is fixedly connected with the axial force loading assembly 10. In the specific use process, there is no relative displacement between the first upper shell 902 and the first base 901, nor between the second upper shell and the second base, and the intermediate force transmission mechanism only completes force transmission.

Further, in the embodiment, specifically, the rotating rod 11 is always perpendicular to the length direction of the second upper shell of the axial force loading assembly 10, and one end of the rotating rod 11 is fixedly connected with the second loading rod of the axial force loading assembly 10. In this way, the axial loading force generated by the axial force loading assembly 10 is transmitted to the rotating rod 11 via the second loading rod, and then to the sleeve shell 3 via the rotating rod 11, and finally applied to the motor spindle 4 via the sleeve shell 3.

Specific examples are used for illustration of the principles and implementation methods of the present disclosure. The description of the above-mentioned embodiments is used to help illustrate the method and the core idea of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A three-dimensional force loading device for a motor spindle, the device comprising:
   a bottom plate;
   a torque loading assembly configured for testing torque performance of the motor spindle, wherein the torque loading assembly and the motor spindle are both arranged on the bottom plate, and the torque loading assembly is in transmission connection with the motor spindle;
   a sleeve shell rotatably sleeved on the motor spindle, wherein the sleeve shell is fixed along an axis direction of the motor spindle;
   a radial force loading assembly configured for testing radial force performance of the motor spindle, wherein the radial force loading assembly is arranged on the bottom plate and configured for providing a radial loading force perpendicular to the axis direction of the motor spindle, and the radial force loading assembly is fixedly connected with the sleeve shell;
   an axial force loading assembly configured for testing axial force performance of the motor spindle, wherein the axial force loading assembly is arranged on the bottom plate and configured for providing an axial loading force along the axis direction of the motor spindle; and
   a intermediate force transmission mechanism connected with the sleeve shell and the axial force loading assembly to transmit the axial loading force supplied by the axial force loading assembly to the sleeve shell.

2. The three-dimensional force loading device for a motor spindle according to claim 1, wherein the motor spindle and the torque loading assembly are respectively provided with a first flange and a second flange which are connected via a flexible connecting belt, to enable the transmission connection between the torque loading assembly and the motor spindle.

3. The three-dimensional force loading device for a motor spindle according to claim 1, wherein the torque loading assembly is a dynamometer.

4. The three-dimensional force loading device for a motor spindle according to claim 1, further comprising a bearing, wherein the sleeve shell is rotatably sleeved on a connecting rod of the motor spindle via the bearing, and the bearing enables the sleeve shell to be fixed along the axis direction of the motor spindle.

5. The three-dimensional force loading device for a motor spindle according to claim 4, wherein the bearing is a deep groove ball bearing or an angular contact bearing.

6. The three-dimensional force loading device for a motor spindle according to claim 1 further comprising an alternating power supply,
   wherein the radial force loading assembly is a radial electromagnetic force loading assembly,
   wherein the axial force loading assembly is an axial electromagnetic force loading assembly,
   wherein the radial electromagnetic force loading assembly is electrically connected with the alternating power supply to provide a radial electromagnetic force perpendicular to the axis direction of the motor spindle, and
   wherein the axial force loading assembly is electrically connected with the alternating power supply to provide an axial electromagnetic force along the axis direction of the motor spindle.

7. The three-dimensional force loading device for a motor spindle according to claim 6, wherein the radial force loading assembly comprises a first base, a first upper shell, a first force detector, a first loading rod, at least one first coil and at least one first magnet,
   wherein the first base is fixedly connected with the bottom plate,
   wherein the first upper shell is arranged above the first base,
   wherein the first upper shell is slidably connected with the first base,
   wherein the at least one first coil and the at least one first magnet are arranged between the first upper shell and the first base,
   wherein the at least one first coil is electrically connected with the alternating power supply,
   wherein the first loading rod is connected with the first upper shell via the first force detector,
   wherein the first force loading rod is fixedly connected with the sleeve shell,
   wherein the axial force loading assembly comprises a second base, a second upper shell, a second force detector, a second loading rod, at least one second coil and at least one second magnet,
   wherein the second base is fixedly connected with the bottom plate,
   wherein the second upper shell is arranged above the second base, wherein the second upper shell is slidably connected with the second base, wherein the at least one second coil and the at least one second magnet are arranged between the second upper shell and the second base, wherein the at least one second coil is electrically connected with the alternating power supply, wherein the second loading rod is connected with the second upper shell via the second force detector, and wherein the second force loading rod is fixedly connected with the intermediate force transmission mechanism.

8. The three-dimensional force loading device for a motor spindle according to claim 7, further comprising a first air supply unit and a second air supply unit, wherein the first air supply unit is configured for supplying air between the first base and the first upper shell to enable the first upper shell to suspend above the first base, and wherein the second air supply unit is configured for supplying air between the second base and the second upper shell to enable the second upper shell to suspend above the second base.

9. The three-dimensional force loading device for a motor spindle according to claim 1, wherein the intermediate force transmission mechanism comprises a rotating rod and a supporting rod, wherein the supporting rod is arranged on the bottom plate, wherein the rotating rod is rotatably connected with the supporting rod, wherein one end of the rotating rod is fixedly connected with the sleeve shell, and wherein an other end of the rotating rod is fixedly connected with the axial force loading assembly.

* * * * *